April 27, 1926.

J. MARETTE

MOTION PICTURE APPARATUS

Filed Sept. 28, 1921

1,582,065

INVENTOR
Jacques Marette

By his ATTORNEY.

Patented Apr. 27, 1926.

1,582,065

UNITED STATES PATENT OFFICE.

JACQUES MARETTE, OF VINCENNES, FRANCE, ASSIGNOR TO PATHE CINEMA ANCIENS ETABLISSEMENTS PATHE FRERES, OF PARIS, FRANCE.

MOTION-PICTURE APPARATUS.

Application filed September 28, 1921. Serial No. 503,930.

*To all whom it may concern:*

Be it known that I, JACQUES MARETTE, citizen of the French Republic, residing at Vincennes, Seine, in the Republic of France, have invented new and useful Improvements in Motion-Picture Apparatus, of which the following is a specification.

This invention has for its object a motion picture apparatus for color cinematography, which comprises the combination of a revoluble disc carrying color screens (for instance three) and rotating by a fraction of a revolution (for instance one-third) for each forward movement of the film corresponding to an image and a revoluble shutter for cutting off the light during the shifting of the image and provided with a single wing, the said shutter making one revolution for each forward movement of the film corresponding to an image.

The said shutter is preferably so disposed as to cut off the light as near as possible to the gate of the apparatus, and it has preferably the shape of a truncated cone.

This disposition has the effect of reducing to a minimum the period of obstruction of the light rays in order to obtain the maximum intensity either when taking the views or when projecting the same.

The accompanying drawing shows diagrammatically and by way of example a form of construction of the device constituting the object of the invention in the particular case in which the film is composed of three series of monochromatic images intended to be projected successively through three suitable selecting color schemes.

Figure 1:
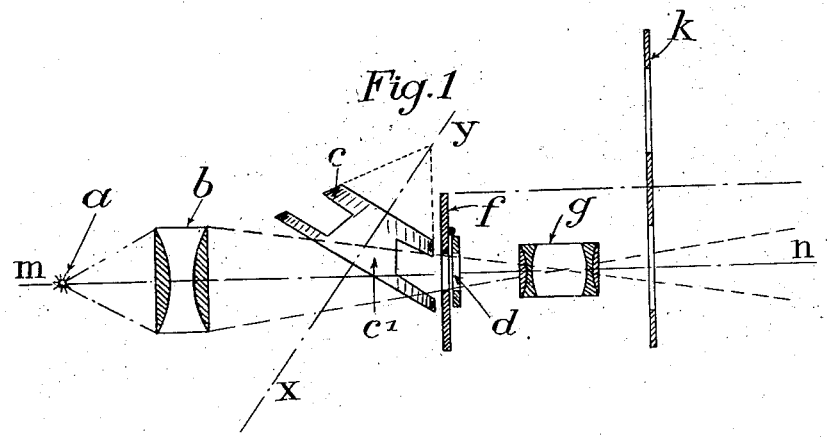
Fig. 1 is a general view of the device.
Figure 2:
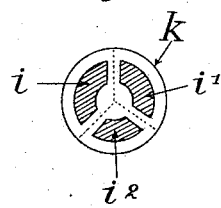
Fig. 2 is a front view of the screen-holder disc.
Figure 3:
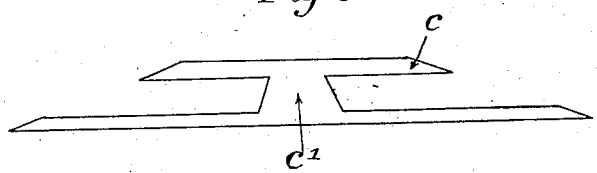
Fig. 3 is a developed view of the truncated cone shaped shutter.

The device as applied to a projection apparatus comprises as for all the ordinary projection apparatus a source of light disposed at $a$, a condenser $b$, a shutter $c$ and an aperture $d$ formed in a gate $f$ wherein the film is displaced by intermittent movements affording the successive arrival of the images into the position coinciding with the aperture. This system is completed by the addition of a projection objective $g$.

In the case under consideration, the shutter employed $c$ is a shutter having the shape of a truncated cone whose axis of rotation $x$—$y$ is oblique with reference to the axis $m$—$n$ of the optical system. This truncated cone shaped shutter is provided with a wing $c^1$ which cuts off the light rays as near as possible to the aperture and during the time necessary for the shifting of the images.

This apparatus is also provided with a disc $k$ revoluble on an axis parallel to that of the optical system and shifted with reference to the latter. This disc has three apertures so disposed as to allow the light rays to pass through. Each of these three apertures is provided with a transparent color screen ($i$, $i^1$, $i^2$), the colors of the three screens being complementary to each other. The rotary screen-holder thus constituted makes a complete revolution while the shutter proper makes three, and three monochromatic images are successively projected in such manner that the screen-holder will automatically bring the corresponding screen in the path of each projected monochromatic image.

It is readily understood in this case that the rectilinear generatrix of the truncated cone shaped shutter will require a time three times as short as the radii of the screen-holding disk for cutting across the beam of light. This device therefore permits to reduce to a minimum the wing of the shutter proper, and increases in the same degree the period of the projection and consequently the amount of light on the screen.

The invention is of course not limited to the details of construction represented or described.

Having now described my invention, what I claim as new and desire to secure by Letters Patent is:

In a motion picture apparatus for motion pictures in colors permitting of taking views or projecting images the combination of a gate provided with an aperture, a cinematographic film adapted to travel in an intermittent manner in said gate so as to expose successively before said aperture each part of the film corresponding to an image, a revoluble disc carrying a number of color screens and adapted to rotate through a fraction of a revolution corresponding to a color screen at each movement of the film corresponding to the feeding of an image and a truncated cone shaped shutter adapted to rotate during a complete revolution of said disc through a number of revolutions equal to the number of screens in said disc; said shutter being provided with a single wing corresponding to the height of an image and coming close to the aperture in the gate of the apparatus.

In testimony whereof I have signed my name to this specification.

JACQUES MARETTE.